US011660973B2

(12) United States Patent
Ando (10) Patent No.: US 11,660,973 B2
(45) Date of Patent: May 30, 2023

(54) CHARGING SYSTEM, VEHICLE, CHARGING METHOD, AND CONTROL DEVICE

(71) Applicant: Toyota Jidosha Kabushiki Kaisha, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 17/109,688

(22) Filed: Dec. 2, 2020

(65) Prior Publication Data

US 2021/0170900 A1 Jun. 10, 2021

(30) Foreign Application Priority Data

Dec. 4, 2019 (JP) .............................. JP2019-219628

(51) Int. Cl.
| | |
|---|---|
| B60L 53/62 | (2019.01) |
| H02J 7/00 | (2006.01) |
| B60L 53/30 | (2019.01) |
| B60L 53/20 | (2019.01) |
| B60L 53/10 | (2019.01) |

(52) U.S. Cl.
CPC .............. *B60L 53/62* (2019.02); *B60L 53/20* (2019.02); *B60L 53/305* (2019.02); *H02J 7/0048* (2020.01); *B60L 53/10* (2019.02); *B60L 2250/16* (2013.01); *H02J 7/0047* (2013.01)

(58) Field of Classification Search
CPC ........ B60L 53/62; B60L 53/20; B60L 53/305; B60L 53/10; B60L 2250/16; H02J 7/0048; H02J 7/0047

USPC ....................................................... 320/109
See application file for complete search history.

(56) References Cited

U.S. PATENT DOCUMENTS

| | | | |
|---|---|---|---|
| 8,933,670 B2 * | 1/2015 | Ohtomo ................. | H02J 7/007 320/160 |
| 2009/0082916 A1 | 3/2009 | Tanaka | |
| 2010/0207588 A1 * | 8/2010 | Lowenthal ............. | B60L 53/65 320/109 |

(Continued)

FOREIGN PATENT DOCUMENTS

| | | |
|---|---|---|
| EP | 2842793 A1 | 3/2015 |
| JP | H09-084269 A | 3/1997 |

(Continued)

*Primary Examiner* — Richard Isla
*Assistant Examiner* — Manuel Hernandez
(74) *Attorney, Agent, or Firm* — Dinsmore & Shohl LLP (57) ABSTRACT

A charging system of an electrically powered vehicle includes a power storage device, a charging device that performs external charging for charging the power storage device with power received from an external power supply, a DCM that outputs information for informing a user of information about charging by the charging device, and an ECU that controls the charging device and the DCM. The ECU controls the charging device to perform the external charging, controls the charging device to limit charging power when a predetermined condition is satisfied during the charging, and controls the DCM to output information for informing the user of a remaining charging time calculated using charging power immediately before limitation while the charging power is limited. The user's feeling of strangeness can be reduced.

10 Claims, 3 Drawing Sheets

(56) References Cited

U.S. PATENT DOCUMENTS

| | | | |
|---|---|---|---|
| 2011/0022256 A1* | 1/2011 | Asada | B60L 53/62 |
| | | | 701/22 |
| 2013/0249483 A1 | 9/2013 | Iida | |
| 2015/0249355 A1 | 9/2015 | Takano et al. | |
| 2019/0199037 A1 | 6/2019 | Ando et al. | |
| 2019/0255996 A1* | 8/2019 | Kusumi | B60L 58/12 |
| 2020/0094702 A1* | 3/2020 | Ohtomo | H01R 13/6675 |

FOREIGN PATENT DOCUMENTS

| | | |
|---|---|---|
| JP | 2009-081917 A | 4/2009 |
| JP | 2019-115163 A | 7/2019 |
| WO | 2012081423 A1 | 6/2012 |
| WO | 2014/046233 A1 | 3/2014 |

* cited by examiner

CHARGING SYSTEM, VEHICLE, CHARGING METHOD, AND CONTROL DEVICE

CROSS REFERENCE TO RELATED APPLICATIONS

This nonprovisional application claims priority to Japanese Patent Application No. 2019-219628 filed on Dec. 4, 2019 with the Japan Patent Office, the entire contents of which are hereby incorporated by reference.

BACKGROUND

Field

The present disclosure relates to a charging system, a vehicle, a charging method, and a control device that can perform external charging for charging a power storage device with power received from an external power supply.

Description of the Background Art

Conventionally, there is provided a charging device that temporarily suspends charging during the charging to a power storage device in order to suppress deterioration of the power storage device (see, for example, International Publication No. 2012/081423).

SUMMARY

In a case where charging is suspended as described in International Publication No. 2012/081423 or a charging current is temporarily limited and thereafter the charging is continued, when a remaining charging time is calculated using charging power at that time point, the remaining charging time changes discontinuously before and after limitation or suspension of the charging. Thus, when the remaining charging time is displayed to a user, the user may have a feeling of strangeness.

The present disclosure has been made to solve the aforementioned problem, and an object thereof is to provide a charging system, a vehicle, a charging method, and a control device that can reduce a user's feeling of strangeness.

A charging system in accordance with the present disclosure includes a power storage device, a charging device that performs external charging for charging the power storage device with power received from an external power supply, an output device that outputs information for informing a user of information about charging by the charging device, and a control device that controls the charging device and the output device. The control device controls the charging device to perform the external charging, controls the charging device to limit charging power when a predetermined condition is satisfied during the charging, and controls the output device to output information for informing the user of a remaining charging time calculated using charging power immediately before limitation while the charging power is limited.

With such a configuration, while the charging power is limited because the predetermined condition is satisfied during the charging, the user is informed of the remaining charging time calculated using the charging power immediately before the limitation, and while the charging power is limited, a remaining charging time calculated using the limited charging power is not displayed. Thus, the remaining charging time does not change discontinuously. As a result, a charging system that can reduce the user's feeling of strangeness can be provided.

In some embodiments, the charging system further includes a connection unit to which a charging connector of a charging cable for externally supplying the power can be connected, and which can switch between a locking state where the connection unit mechanically locks the charging connector and an unlocking state where the connection unit does not mechanically lock the charging connector. The predetermined condition includes a condition that the connection unit switches to the unlocking state during the charging.

With such a configuration, while the charging power is limited because the charging connector is set to an unlocked state during the charging, the user is informed of the remaining charging time calculated using the charging power immediately before the limitation. As a result, even when the charging connector is set to the unlocked state, the user's feeling of strangeness can be reduced.

In some embodiments, when the limitation of the charging power is canceled, the control device controls the output device to output information for informing the user of a remaining charging time calculated using charging power at a present time point.

With such a configuration, when the limitation of the charging power is canceled, the user is informed of the remaining charging time calculated using the charging power at the present time point. As a result, when the limitation of the charging power is canceled, the user can be informed of a more accurate remaining charging time.

In some embodiments, while the charging power is limited, the control device controls the output device to output information for informing the user that the charging power is limited.

With such a configuration, while the charging power is limited, the user is informed that the charging power is limited. As a result, the user can notice that the charging power is limited.

According to another aspect of the present disclosure, a vehicle includes the charging system described above. With such a configuration, a vehicle that can reduce the user's feeling of strangeness can be provided.

According to still another aspect of the present disclosure, a charging method is a charging method performed by a charging system. The charging system includes a power storage device, a charging device that performs external charging for charging the power storage device with power received from an external power supply, an output device that outputs information for informing a user of information about charging by the charging device, and a control device that controls the charging device and the output device. The charging method includes: controlling, by the control device, the charging device to perform the external charging; controlling, by the control device, the charging device to limit charging power, when a predetermined condition is satisfied during the charging; and controlling, by the control device, the output device to output information for informing the user of a remaining charging time calculated using charging power immediately before limitation, while the charging power is limited.

With such a configuration, a charging method that can reduce the user's feeling of strangeness can be provided.

According to still another aspect of the present disclosure, a control device is a control device that performs control of external charging for charging a power storage device with power received from an external power supply, and control of output of information for informing a user of information about the external charging. The control device controls charging power to be limited, when a predetermined condition is satisfied during charging while the control device performs the control of the external charging, and performs the control of output of information for informing the user of a remaining charging time calculated using charging power immediately before limitation, while the charging power is limited.

With such a configuration, a control device that can reduce the user's feeling of strangeness can be provided.

In some embodiments, the control device further includes a connection unit to which a charging connector of a charging cable for externally supplying the power can be connected, and which can switch between a locking state where the connection unit mechanically locks the charging connector and an unlocking state where the connection unit does not mechanically lock the charging connector. The predetermined condition includes a condition that the connection unit switches to the unlocking state during the charging.

With such a configuration, even when the charging connector is set to the unlocked state, the user's feeling of strangeness can be reduced.

In some embodiments, when the limitation of the charging power is canceled, the control device performs the control of output of information for informing the user of a remaining charging time calculated using charging power at a present time point.

With such a configuration, when the limitation of the charging power is canceled, the user can be informed of a more accurate remaining charging time.

In some embodiments, while the charging power is limited, the control device performs the control of output of information for informing the user that the charging power is limited.

With such a configuration, the user can notice that the charging power is limited.

The foregoing and other objects, features, aspects, and advantages of the present disclosure will become more apparent from the following detailed description of the present disclosure when taken in conjunction with the accompanying drawings.

DETAILED DESCRIPTION

[Configuration of Electrically Powered Vehicle]

Figure 1:
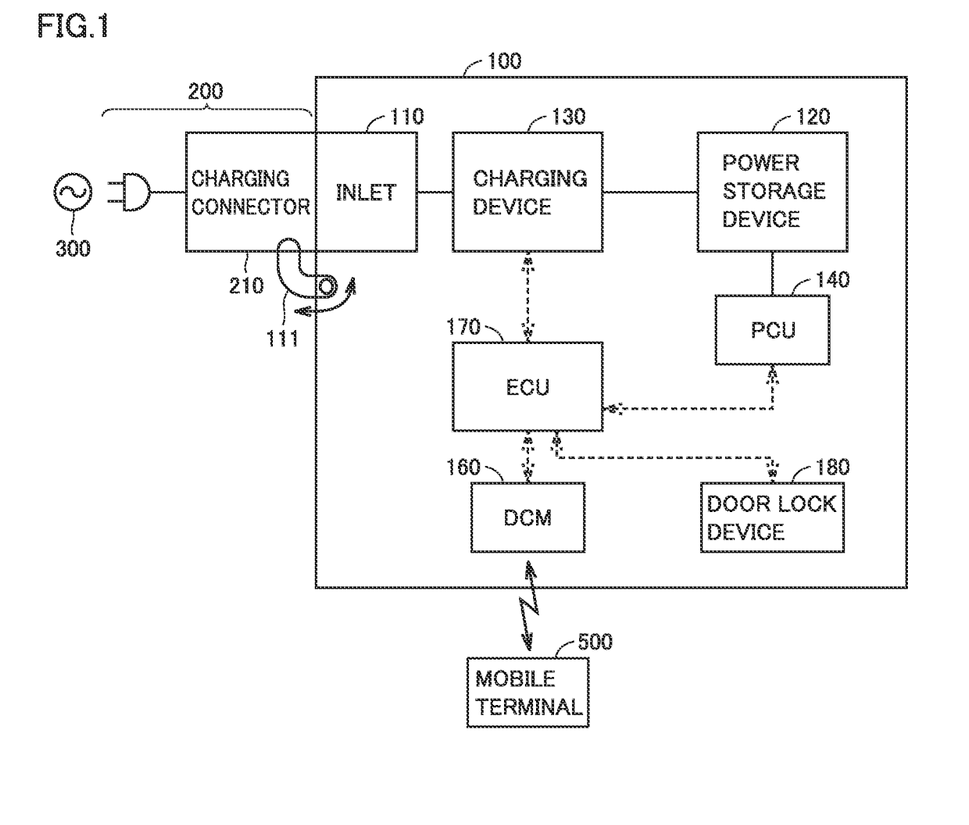
FIG. 1 is an overall block diagram of an electrically powered vehicle shown as an example of a vehicle according to an embodiment of the present disclosure.

FIG. 1 is an overall block diagram of an electrically powered vehicle shown as an example of a vehicle according to an embodiment of the present disclosure. The electrically powered vehicle is an electric car, a hybrid car, or a fuel cell car, for example.

Referring to FIG. 1, an electrically powered vehicle 100 includes an inlet 110, a connector lock device 111, a power storage device 120, a charging device 130, a power control unit (PCU) 140, a data communication module (DCM) 160, an electronic control unit (ECU) 170, and a door lock device 180.

Door lock device 180 is a device that can switch between a locking state where door lock device 180 mechanically locks a door (not shown) of electrically powered vehicle 100 and an unlocking state where door lock device 180 does not mechanically lock the door.

A charging connector 210 of a charging cable 200 is connected to inlet 110. Then, power from an external power supply 300 is transmitted to electrically powered vehicle 100 through charging connector 210 and inlet 110.

Connector lock device 111 is a device that can switch between a locking state where connector lock device 111 mechanically locks charging connector 210 connected to inlet 110 and an unlocking state where connector lock device 111 does not mechanically lock charging connector 210.

Power storage device 120 is a chargeable/dischargeable power storage component. Power storage device 120 includes a secondary battery such as a lithium ion battery, a nickel hydrogen battery, or a lead storage battery, or a power storage element such as an electric double layer capacitor, for example.

Charging device 130 is connected between inlet 110 and power storage device 120. Charging device 130 converts AC power supplied from external power supply 300 through inlet 110 into charging power for power storage device 120, and charges power storage device 120. This charging from external power supply 300 to power storage device 120 of electrically powered vehicle 100 will be hereinafter also referred to as "external charging."

PCU 140 includes an inverter and a converter, and supplies the power supplied from power storage device 120 to a drive motor (not shown) to generate a traveling drive force for electrically powered vehicle 100.

DCM 160 is a communication device that can wirelessly communicate with an external apparatus such as a user's mobile terminal 500. Mobile terminal 500 is a general-purpose terminal that can be carried by the user, such as a smartphone. DCM 160 includes a communication module in conformity with a communication standard such as Wideband Code Division Multiple Access (W-CDMA) or Long Term Evolution (LTE), or a wireless local area network (LAN) standard such as Institute of Electrical and Electronic Engineers (IEEE) 802.11, for example. It should be noted that, although not shown, communication between DCM 160 and mobile terminal 500 is performed through a server of a business operator of a communication service using DCM 160, a server of a communication carrier, a base station and a communication line, and a communication network including a wide area network (WAN) such as the Internet and a LAN such as an on-premises wireless LAN.

ECU 170 includes a central processing unit (CPU) and a memory which are not shown therein, and controls each device (charging device 130, PCU 140, DCM 160, connector lock device 111, door lock device 180) of electrically powered vehicle 100, based on information stored in the memory and information from each sensor (not shown). ECU 170 performs predetermined functions such as the function of external charging to power storage device 120 including timer charging.

Next, the timer charging will be described. The timer charging is a function for automatically completing the external charging of power storage device 120 by a scheduled departure time set beforehand by the user. The user sets a next scheduled departure time through a navigation device (not shown), for example. Considering the electricity rate for each time zone and the like, ECU 170 calculates a charging start time to complete the external charging of power storage device 120 by the scheduled departure time. When the calculated charging start time is reached, ECU 170 controls charging device 130 to start the external charging of power storage device 120. Thereby, in electrically powered vehicle 100, the external charging of power storage device 120 can be completed by the scheduled departure time. It should be noted that the scheduled departure time does not necessarily have to be set by the user, and for example, ECU 170 may predict a next scheduled departure time from the circumstances in which the user uses electrically powered vehicle 100. In addition, the scheduled departure time does not necessarily have to be set through the navigation device, and for example, may be set by receiving the content of user input into mobile terminal 500 such as a smartphone, through DCM 160.

When the timer charging is completed, ECU 170 transmits a message indicating that the charging is completed (hereinafter also referred to as a "notification of completion of the external charging") to the user's mobile terminal 500 through DCM 160. Upon receiving this message, the user can notice that the external charging is completed.

[Description of Charging Control Processing]

Conventionally, there is provided a charging system that temporarily suspends charging during the charging to power storage device 120 in order to suppress deterioration of power storage device 120. There is also provided a charging system that unlocks a connector in cooperation with the unlocking of a door and stops charging.

In a case where charging is suspended as described above or a charging current is temporarily limited and thereafter the charging is continued, when a remaining charging time is calculated using charging power at that time point, the remaining charging time changes discontinuously before and after limitation or suspension of the charging. Thus, when the remaining charging time is displayed to the user, the user may have a feeling of strangeness.

Accordingly, in the charging system in accordance with the present disclosure, ECU 170 controls charging device 130 to perform the external charging, controls charging device 130 to limit charging power when a predetermined condition is satisfied during the charging, and controls DCM 160 to output information for informing the user of a remaining charging time calculated using charging power immediately before limitation while the charging power is limited.

Thereby, while the charging power is limited because the predetermined condition is satisfied during the charging, the user is informed of the remaining charging time calculated using the charging power immediately before the limitation, and while the charging power is limited, a remaining charging time calculated using the limited charging power is not displayed. Thus, the remaining charging time does not change discontinuously. As a result, the user's feeling of strangeness can be reduced.

Figure 2:
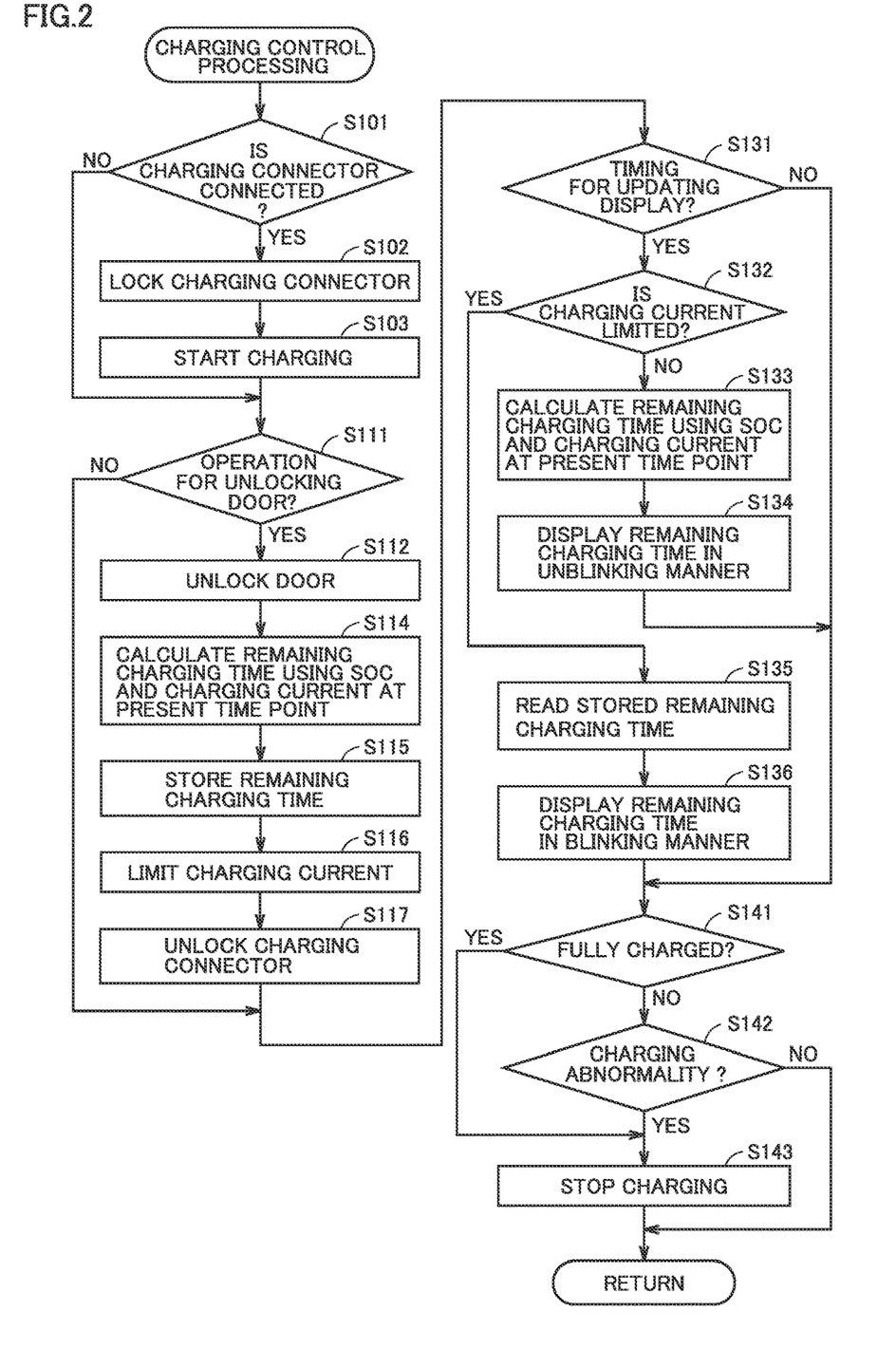
FIG. 2 is a flowchart showing a flow of charging control processing in the present embodiment.

In the following, control in the present embodiment will be described. FIG. 2 is a flowchart showing a flow of charging control processing in the present embodiment. This charging control processing is invoked from higher order processing performed by ECU 170 at every predetermined cycle, and is performed.

Referring to FIG. 2, ECU 170 determines whether or not charging connector 210 is connected to inlet 110 (step S101). When ECU 170 determines that charging connector 210 is connected (YES in step S101), ECU 170 controls connector lock device 111 to lock charging connector 210 (step S102), and controls charging device 130 to start charging (step S103).

Then, ECU 170 determines whether or not an operation for unlocking door lock device 180 is performed by the user (step S111). When ECU 170 determines that the operation for unlocking the door is performed (YES in step S111), ECU 170 controls door lock device 180 to switch to the unlocking state (step S112).

Then, ECU 170 specifies the state of charge (SOC) and a charging current at a present time point, calculates a remaining charging time using the specified SOC and charging current (step S114), and stores the remaining charging time in the memory (step S115). The SOC represents the state of charge (charging rate) of power storage device 120, and can be calculated using various known methods such as a method by integrating current values (coulomb counting), a method by estimating an open circuit voltage (OCV), or the like, for example. The remaining charging time represents a time required from the present time point to reach the SOC at the end of charging (or a full charge), and can be calculated for example by multiplying a full charge capacity of power storage device 120 by the SOC to obtain a remaining capacity, subtracting the remaining capacity from the full charge capacity, and dividing a difference therebetween by the charging current.

Subsequently, ECU 170 controls charging device 130 to limit the charging current (step S116), and controls connector lock device 111 to set charging connector 210 to the unlocked state (step S117). For example, the charging current may be decreased to a predetermined current, or may be decreased by a predetermined ratio. It should be noted that the charging current may be limited to zero (0).

When ECU 170 determines that the operation for unlocking the door is not performed (NO in step S111), and after step S117, ECU 170 determines whether or not timing for updating display of the remaining charging time is reached (step S131). This timing may be at every predetermined time, or may be timing at which the display of the remaining charging time changes (for example, timing at one-minute interval in a case where the display is updated every minute), for example.

When ECU 170 determines that the timing for updating the display of the remaining charging time is reached (YES in step S131), ECU 170 determines whether or not the charging current is limited (step S132) because the processing in step S116 is performed.

When ECU 170 determines that the charging current is not limited (NO in step S132), ECU 170 specifies the SOC and the charging current at a present time point, calculates a remaining charging time using the specified SOC and charging current (step S133), controls DCM 160 to transmit information for displaying the calculated remaining charging time without blinking to the user's mobile terminal 500 through DCM 160 (step S134), and advances the processing to be performed to step S141. Thereby, in mobile terminal 500, the remaining charging time is displayed in an unblinking manner.

On the other hand, when ECU 170 determines that the charging current is limited (YES in step S132), ECU 170 reads the remaining charging time stored in step S115 from the memory (step S135), controls DCM 160 to transmit information for displaying the read remaining charging time in a blinking manner to the user's mobile terminal 500 through DCM 160 (step S136), and advances the processing to be performed to step S141. Thereby, in mobile terminal 500, the remaining charging time is displayed in a blinking manner.

Then, ECU 170 determines whether or not power storage device 120 is in a fully charged state (step S141). When ECU 170 determines that power storage device 120 is not in the fully charged state (NO in step S141), ECU 170 determines whether or not a charging abnormality occurs in the external charging to power storage device 120 (step S142). When ECU 170 determines that no charging abnormality occurs in the external charging to power storage device 120 (NO in step S142), ECU 170 returns the processing to be performed to the higher order processing that has invoked this charging control processing.

When ECU 170 determines that power storage device 120 is in the fully charged state (YES in step S141), and when ECU 170 determines that a charging abnormality occurs in the external charging to power storage device 120 (YES in step S142), ECU 170 controls charging device 130 to stop the external charging (step S143).

Figure 3:
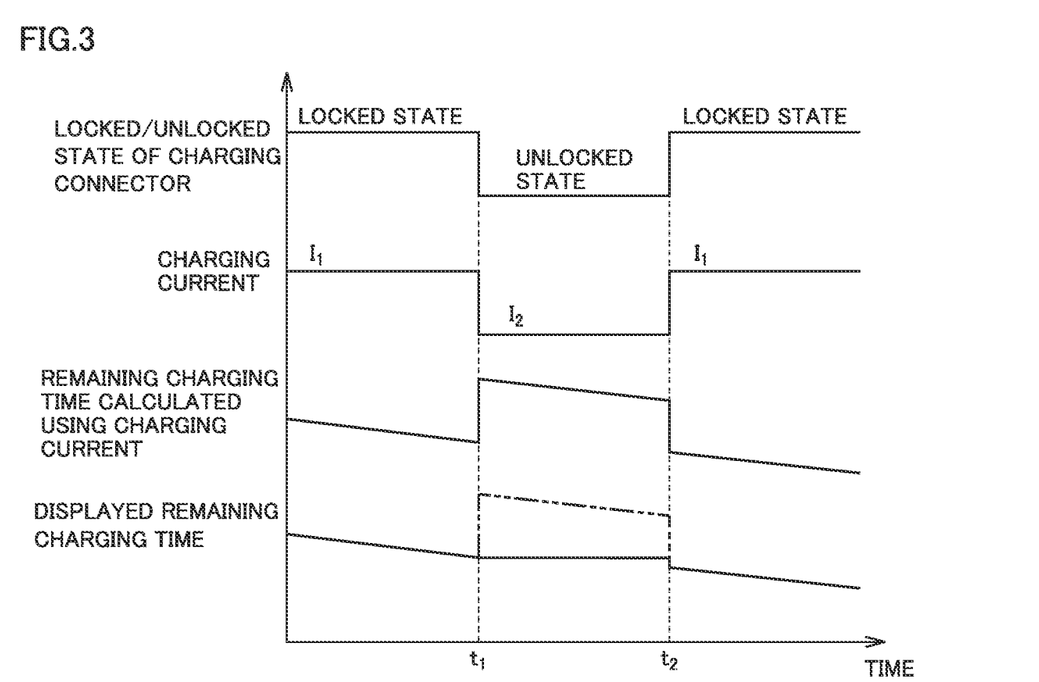
FIG. 3 is a view showing an example of a timing chart of the charging control processing in the present embodiment.

FIG. 3 is a view showing an example of a timing chart of the charging control processing in the present embodiment. Referring to FIG. 3, the axis of abscissas of the timing chart represents time. The axis of ordinates of a first row of the timing chart represents whether or not the state of charging connector 210 is the locked state or the unlocked state. The solid line graph of the first row of the timing chart represents transition of whether or not the state of charging connector 210 is the locked state or the unlocked state. The axis of ordinates of a second row of the timing chart represents a charging current supplied to electrically powered vehicle 100. The solid line graph of the second row of the timing chart represents transition of the charging current supplied to electrically powered vehicle 100. The axis of ordinates of a third row of the timing chart represents a remaining charging time calculated using the charging current at that time point. The solid line graph of the third row of the timing chart represents transition of the remaining charging time calculated using the charging current at that time point. The axis of ordinates of a fourth row of the timing chart represents a displayed remaining charging time. The solid line graph of the fourth row of the timing chart represents transition of the displayed remaining charging time. The chain double-dashed line graph of the fourth row of the timing chart represents transition of the remaining charging time calculated using the charging current at that time point.

When charging connector 210 is switched from the locked state to the unlocked state at a time $t_1$, the charging current to power storage device 120 is limited from $I_1$ to $I_2$ ($<I_1$). Thereby, the remaining charging time calculated using the charging current at a present time point increases discontinuously. However, in the present embodiment, the remaining charging time calculated using the charging current immediately before the charging current is limited is displayed as shown in step S114, step S115, step S135, and step S136 of FIG. 2, rather than displaying the remaining charging time calculated using the charging current at the present time point. Thus, a change in the remaining charging time before and after the limitation can be eliminated, when compared with a case where the remaining charging time calculated using the charging current at the present time point is displayed also when the charging current is limited.

In addition, when charging connector 210 is switched from the unlocked state to the locked state at a time $t_2$, the limitation of the charging current to power storage device 120 is canceled, and the charging current is increased from $I_2$ to $I_1$.

Thereby, the remaining charging time calculated using the charging current at a present time point decreases discontinuously. However, in the present embodiment, the remaining charging time calculated using the charging current at the present time point is displayed from the state where the remaining charging time calculated using the charging current immediately before the charging current is limited is displayed. Thus, a change in the remaining charging time before and after the cancellation of the limitation can be reduced, when compared with the case where the remaining charging time calculated using the charging current at the present time point is displayed.

[Variations]

(1) In the embodiment described above, as shown in step S135 and step S136 of FIG. 2, ECU 170 and DCM 160 output information for informing the user of the remaining charging time calculated using the charging current immediately before the limitation, to mobile terminal 500, and thereby the remaining charging time is displayed on the user's mobile terminal 500. That is, DCM 160 and a portion of ECU 170 for outputting information to DCM 160 serve as an output device that outputs information for informing the user of information about charging by charging device 130, to mobile terminal 500.

However, the present disclosure is not limited thereto, and ECU 170 may output information for informing the user of the remaining charging time calculated using the charging current immediately before the limitation, to a display unit (for example, an instrument panel) included in electrically powered vehicle 100, and thereby the remaining charging time may be displayed on the display unit of electrically powered vehicle 100. That is, a portion of ECU 170 for outputting information to the display unit may serve as an output device that outputs information for informing the user of information about charging by charging device 130, to the display unit.

(2) In the embodiment described above, as shown in step S136 of FIG. 2, the information for informing the user, while the charging power is limited, that the charging power is limited is the information for displaying the remaining charging time in a blinking manner. That is, the user is informed that the charging power is limited, by displaying the remaining charging time in a blinking manner.

However, the present disclosure is not limited thereto, and the information for informing the user, while the charging power is limited, that the charging power is limited may be information for displaying the remaining charging time in a display manner different from a display manner when the charging power is not limited (for example, by using a different color, character size, character shape, or blinking cycle, or using reversed display). That is, the user may be informed that the charging power is limited, by displaying the remaining charging time when the charging power is limited in the display manner different from the display manner when the charging power is not limited.

(3) In the embodiment described above, as shown in step S111 and step S117 of FIG. 2, charging connector 210 is set to the unlocked state in cooperation with the operation for unlocking the door. However, the present disclosure is not limited thereto, and charging connector 210 may be set to the unlocked state when another condition is satisfied. For example, charging connector 210 may be set to the unlocked state by an operation for unlocking charging connector 210 itself.

(4) In the embodiment described above, the remaining charging time displayed in step S136 is calculated in step S114 using the charging current (charging power) immediately before the limitation and the SOC immediately before the limitation. However, the present disclosure is not limited thereto, and the remaining charging time displayed in step S136 may be calculated using the charging current (charging power) immediately before the limitation and the SOC at a present time point.

CONCLUSION (1-1) As shown in FIG. 1, a charging system of electrically powered vehicle 100 includes power storage device 120, charging device 130 that performs external charging for charging power storage device 120 with power received from external power supply 300, DCM 160 and a portion of ECU 170 for outputting information to DCM 160 that output information for informing a user of information about charging by charging device 130, and ECU 170 that controls charging device 130 and DCM 160.

As shown in FIG. 2, ECU 170 controls charging device 130 to perform the external charging (step S103), controls charging device 130 to limit charging power (step S116) when a predetermined condition is satisfied during the charging, and controls DCM 160 to output information for informing the user of a remaining charging time calculated using charging power immediately before limitation (step S135, step S136) while the charging power is limited.

Thereby, while the charging power is limited because the predetermined condition is satisfied during the charging, the user is informed of the remaining charging time calculated using the charging power immediately before the limitation, and while the charging power is limited, a remaining charging time calculated using the limited charging power is not displayed. Thus, as shown in FIG. 3, the remaining charging time does not change discontinuously. As a result, the user's feeling of strangeness can be reduced.

(1-2) As shown in FIG. 1, the charging system of electrically powered vehicle 100 further includes inlet 110 including connector lock device 111 to which charging connector 210 of charging cable 200 for externally supplying the power can be connected, and which can switch between a locking state where connector lock device 111 mechanically locks charging connector 210 and an unlocking state where connector lock device 111 does not mechanically lock charging connector 210. The predetermined condition includes a condition that connector lock device 111 switches to the unlocking state during the charging.

Thereby, while the charging power is limited because charging connector 210 is set to the unlocked state during the charging, the user is informed of the remaining charging time calculated using the charging power immediately before the limitation. As a result, even when charging connector 210 is set to the unlocked state, the user's feeling of strangeness can be reduced.

(1-3) As shown in FIG. 2, when the limitation of the charging power is canceled, ECU 170 controls DCM 160 to output information for informing the user of a remaining charging time calculated using charging power at a present time point (step S133, step S134).

Thereby, when the limitation of the charging power is canceled, the user is informed of the remaining charging time calculated using the charging power at the present time point. As a result, when the limitation of the charging power is canceled, the user can be informed of a more accurate remaining charging time.

(1-4) As shown in FIG. 2, while the charging power is limited, ECU 170 controls DCM 160 to output information for informing the user that the charging power is limited (for example, information for displaying the remaining charging time in a blinking manner, which is different from the display manner when the charging power is not limited) (step S136).

Thereby, while the charging power is limited, the user is informed that the charging power is limited. As a result, the user can notice that the charging power is limited.

(1-5) As shown in FIG. 1, electrically powered vehicle 100 includes the charging system described above. Thereby, the user's feeling of strangeness can be reduced.

(1-6) As shown in FIG. 2, a charging method is a charging method performed by the charging system of electrically powered vehicle 100. As shown in FIG. 1, the charging system includes power storage device 120, charging device 130 that performs external charging for charging power storage device 120 with power received from an external power supply, DCM 160 that outputs information for informing a user of information about charging by charging device 130, and ECU 170 that controls charging device 130 and DCM 160. The charging method includes: controlling, by ECU 170, charging device 130 to perform the external charging (step S103); controlling, by ECU 170, charging device 130 to limit charging power (step S116) when a predetermined condition is satisfied during the charging; and controlling, by ECU 170, DCM 160 to output information for informing the user of a remaining charging time calculated using charging power immediately before limitation (step S135, step S136) while the charging power is limited. Thereby, the user's feeling of strangeness can be reduced.

(1-7) As shown in FIG. 1, ECU 170 performs control of external charging for charging power storage device 120 with power received from external power supply 300, and control of output of information for informing a user of information about the external charging. As shown in FIG. 2, ECU 170 controls charging power to be limited (step S116) when a predetermined condition is satisfied during charging while ECU 170 performs the control of the external charging, and performs the control of output of information for informing the user of a remaining charging time calculated using charging power immediately before limitation (step S135, step S136) while the charging power is limited. Thereby, the user's feeling of strangeness can be reduced.

(2-1) Conventionally, there are provided a charging system that operates a connector lock in cooperation with a door lock (Japanese Patent Laying-Open No. 2009-081917), a charging system that unlocks a charging connector and stops charging, and, after a lapse of a predetermined time, locks the charging connector again and resumes the charging (European Patent Application Publication No. 2842793), and a charging system that allows external charging when a connector for the external charging is locked, and does not allow the external charging when the connector is not in a locked state (Japanese Patent Laying-Open No. 2019-115163).

However, according to these charging systems, charging is stopped when the charging connector is set to an unlocked state. Thus, in cases where the door lock is frequently set to the unlocked state and thereby the charging connector is frequently set to the unlocked state, or where the charging connector is set to the unlocked state for a long period under other conditions, charging does not proceed at all when the charging connector is set to the unlocked state.

In the embodiment described above, as shown in FIG. 1, the charging system of electrically powered vehicle 100 includes power storage device 120, charging device 130 that performs external charging for charging power storage device 120 with power received from external power supply 300, inlet 110 including connector lock device 111 to which charging connector 210 of charging cable 200 for externally supplying the power can be connected and which can switch between a locking state where connector lock device 111 mechanically locks charging connector 210 and an unlocking state where connector lock device 111 does not mechanically lock charging connector 210, and ECU 170 that controls charging device 130 and connector lock device 111. As shown in FIG. 2, ECU 170 controls charging device 130 to perform the external charging (step S103), and controls charging device 130 to limit charging power (step S116, step S117) when a condition that connector lock device 111 switches to the unlocking state during the charging is satisfied.

Thereby, the charging power can be limited in cooperation with charging connector 210 being set to the unlocked state. Thus, even when charging connector 210 is set to the unlocked state, charging is continued using limited power. As a result, charging can proceed even when charging connector 210 is set to the unlocked state.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A charging system comprising:
    a power storage device;
    a charging device that performs external charging for charging the power storage device with power received from an external power supply;
    an output device that outputs information for informing a user of information about charging by the charging device; and
    a control device that controls the charging device and the output device,
    the control device
        controlling the charging device to perform the external charging,
        controlling the charging device to limit charging power, when a predetermined condition is satisfied during the charging, and
        controlling the output device to output information for informing the user of a remaining charging time calculated using charging power immediately before limitation, while the charging power is limited.

2. The charging system according to claim 1, further comprising a connection unit to which a charging connector of a charging cable for externally supplying the power can be connected, and which can switch between a locking state where the connection unit mechanically locks the charging connector and an unlocking state where the connection unit does not mechanically lock the charging connector, wherein
    the predetermined condition includes a condition that the connection unit switches to the unlocking state during the charging.

3. The charging system according to claim 1, wherein, when the limitation of the charging power is canceled, the control device controls the output device to output information for informing the user of a remaining charging time calculated using charging power at a present time point.

4. The charging system according to claim 1, wherein, while the charging power is limited, the control device controls the output device to output information for informing the user that the charging power is limited.

5. A vehicle comprising the charging system according to claim 1.

6. A charging method performed by a charging system, the charging system including
    a power storage device,
    a charging device that performs external charging for charging the power storage device with power received from an external power supply,
    an output device that outputs information for informing a user of information about charging by the charging device, and
    a control device that controls the charging device and the output device, the charging method comprising:
    controlling, by the control device, the charging device to perform the external charging;
    controlling, by the control device, the charging device to limit charging power, when a predetermined condition is satisfied during the charging; and
    controlling, by the control device, the output device to output information for informing the user of a remaining charging time calculated using charging power immediately before limitation, while the charging power is limited.

7. A control device that performs control of external charging for charging a power storage device with power received from an external power supply, and control of output of information for informing a user of information about the external charging,
    the control device
        controlling charging power to be limited, when a predetermined condition is satisfied during charging while the control device performs the control of the external charging, and
        performing the control of output of information for informing the user of a remaining charging time calculated using charging power immediately before limitation, while the charging power is limited.

8. The control device according to claim 7, further comprising a connection unit to which a charging connector of a charging cable for externally supplying the power can be connected, and which can switch between a locking state where the connection unit mechanically locks the charging connector and an unlocking state where the connection unit does not mechanically lock the charging connector, wherein
    the predetermined condition includes a condition that the connection unit switches to the unlocking state during the charging.

9. The control device according to claim 7, wherein, when the limitation of the charging power is canceled, the control device performs the control of output of information for informing the user of a remaining charging time calculated using charging power at a present time point.

10. The control device according to claim 7, wherein, while the charging power is limited, the control device performs the control of output of information for informing the user that the charging power is limited.

* * * * *